March 13, 1956    G. GOETTL    2,738,232
METERING TIP FOR WATER DISTRIBUTION
TUBES IN EVAPORATIVE COOLERS
Filed July 20, 1955
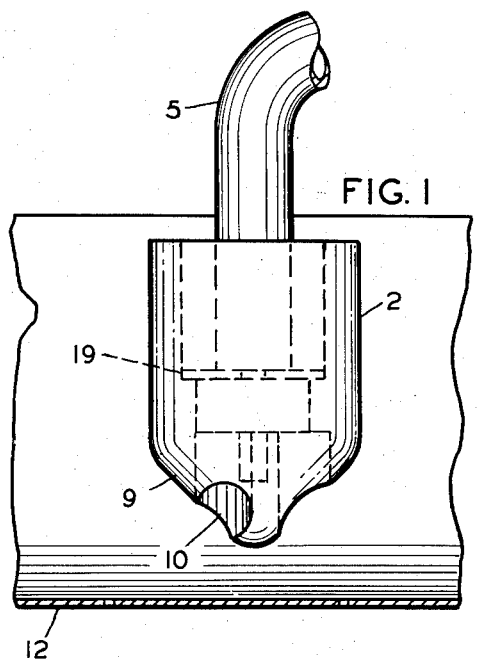
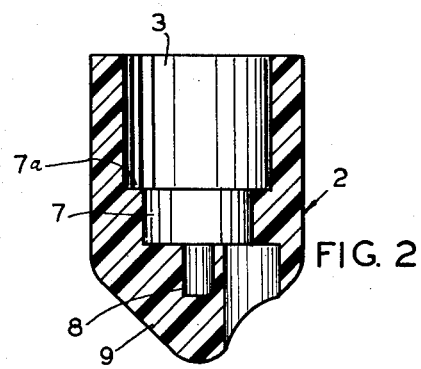
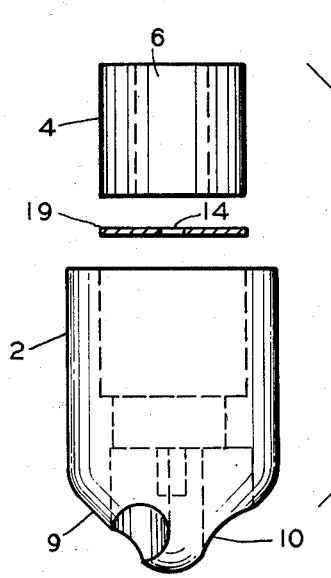
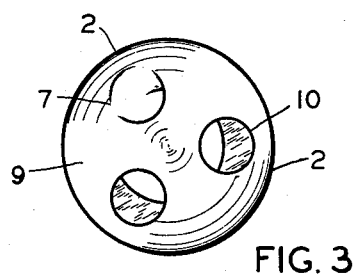
INVENTOR.
Gust Goettl
BY Scott L. Norwich
   atty

United States Patent Office 2,738,232
Patented Mar. 13, 1956

2,738,232

METERING TIP FOR WATER DISTRIBUTION TUBES IN EVAPORATIVE COOLERS

Gust Goettl, Phoenix, Ariz.

Application July 20, 1955, Serial No. 523,284

2 Claims. (Cl. 299—141)

This invention concerns a metering tip for water distributing tubes in evaporative coolers.

Heretofore the flow in distributing tubes which convey water to the top of pads of evaporative coolers has been controlled by limiting the size of the orifice in each tube opening in the distributor head into which each tube is fitted and through which water is distributed to the several tubes which lead to the cooler pads.

When city water pressure, which is approximately 40 pounds per square inch, is used and connected directly to a multiple distributing head the orifices must be constricted and made small enough so that the flow is even in the several distribution tubes and so that, in case the distribution system is not exactly level, tubes on the lower side will not rob those on the upper side of their share of water by siphoning.

On the other hand when a circulating pump is used the pressure is much lower and the orifices must be opened to the full interior diameter of the distribution tubes. Since, when a circulating pump is used there is always ample flow, there is no danger of siphoning.

In practice it has been found that it is time consuming and inefficient to change the orifices in the multiple distribution head. Other means have been tried to control the flow in the tubes, such as, for example, ordinary constriction, or flattening, of the tips of the distribution tubes. In practice, this has proved to be unsatisfactory because wherever water escapes from a tube which is subject to evaporation, a crust of calcium, or other material dissolved in the water, forms on and around the orifice and tends to close it. This causes the flow to vary and finally to be entirely shut off.

In view of the foregoing I have devised a metering tip which has for its objects—

First, a provision of a tip having a pliable body which can be easily attached to the ends of water distribution tubes used in evaporative coolers which has an interior chamber which will shield the end of the distribution tube and prevent evaporation such as would form a crust of lime and/or alkali.

A second object is to provide a tip which can be easily attached to or removed from the end of a distribution tube, as aforesaid, and which has a water distribution chamber surrounding the end of the distribution tube to divert its direction of flow and to conduct the water to a plurality of larger orifices at a greatly lowered velocity so that the water will enter the trough or channel at the top of an evaporating pad at such low velocity that it will not splash or flow over the side of the trough.

A third object is to provide a tip for use, as aforesaid, which has an interior chamber adapted to receive an orifice regulating disk or washer which has an orifice of predetermined diameter to control the flow of water through the distribution tube; said tip being combined with a bushing of resilient material which is adapted to fit into the tip, hold the washer in place, and fit onto the end of the distribution tube in a way so that the tip can be easily removed to give access to said washer and to permit cleaning.

Other objects will appear hereinafter.

I attain the foregoing objects by means of the construction, devices and combinations of parts and devices shown in the accompanying drawings in which—

Figure 1 is a side elevation of a flow metering tip embodying my improvements, mounted on the end of a water distributing tube in an evaporative cooler together with a fragment of the evaporative pad and trough on top thereof;

Figure 2 is a vertical mid sectional elevational view of the metering tip;

Figure 3 is a bottom view of the metering tip;

Figure 4 is a side elevation of the metering tip, orifice washer, and bushing drawn in expanded relation.

Similar numerals refer to similar parts in the several views.

The body 2 of the metering tip is cylindrical and has a round hole 3 at its upper end of a size sufficient to admit cylindrical bushing 4. This bushing has an axial hole 6 which fits onto the end of distribution tube 5, with sufficient compression to secure retention. It is to be understood that this tube is one of several branching from a distribution head.

At the bottom of hole 3 in tip body 2 there is a circular, concentrically positioned, recess 7 which has a diameter smaller than that of hole 3 and forms an annular shelf 7a to retain orifice washer 19. Recess 7 forms a distribution and pressure reduction chamber. In the bottom of this recess there is an axially positioned circular water deflection chamber 8 of still smaller diameter.

The bottom portion 9 of the outside of body 2 has a conical contour. Three discharge holes 10 are annularly disposed within the lower portion of body 2 and extend from the conical surface of this conical bottom portion 9 upwardly into the body and open into the bottom of chamber 7. These three holes constitute discharge orifices from which water leaves the tip at a very slow velocity. At this retarded velocity it appears to bubble, due to release of dissolved air. The combined flow capacity of these three holes greatly exceeds the flow capacity of tube 5. Located annularly, as they are, at 120° angular intervals, in the exemplary form illustrated, there is little tendency for water issuing from them to force its way over the side of distribution trough 12, or to flow excessively one way or the other along its length.

When water under a head pressure of 40 p. s. i. or more is applied to tube 5 washer 19 is made with a small opening. This is small enough so that a head pressure is maintained and water will be held back in all tubes extending from the distribution head, and will flow evenly from all tips.

Since the water flows through the orifice 14 of washer 9 with considerable force its velocity must be slowed. This is done when the flow enters diversion chamber 8, which is axially aligned with the orifice 14. Water first strikes the bottom of this chamber and then is diverted and flows upwardly into distributing chamber 7 where its velocity is slowed, and from this chamber it flows at a decreased velocity ot discharge holes 10. From these holes it exits into trough 12 at a still slower velocity.

Since the orifice 14 is protected from any draft of air little evaporation takes place on its surfaces and it does not become coated with lime. The flow through it therefore remains constant. Any lime, or the like that may be deposited due to evaporation, will be formed around the lower edges of holes 10. These are so large that constriction is very unlikely.

When the water source is a circulating pump the washer 19 is either entirely removed or is exchanged for a washer having a much larger orifice. The flow from this orifice enters chamber 7 with less deflecting action in chamber 8. The flow being in greater volume, but at a lower head pressure, is less likely to cause siphoning in tubes on the low side of an unlevel installation. The velocity is, nevertheless, reduced somewhat as it leaves holes 10 and splashing eliminated. The orifice and inside of tube 5 is similarly protected from excessive evaporation and liming.

The bushing 4, being made of resilient material, such as soft rubber, forms a pressure tight seal on the end of tube 5, and in hole 3, and holds washer 19 securely on shelf 7a. The body 2 being made of firmer material, such as hard rubber is therefore removably retained on the tube, and can easily be removed for cleaning or for replacement of washer 19. Washer 19 is preferably made of non-corrosive metal.

All parts can be easily and cheaply made of the above mentioned materials, and can be easily and rapidly assembled for use.

I claim:

1. A metering tip for the ends of water distribution pipes of evaporative coolers, composed of a body having a round bushing hole centrally disposed in its upper portion, a smaller hole therebelow providing an annular shelf at the bottom of said bushing hole and forming a pressure reducing chamber, and a deflection chamber centrally disposed in the bottom of said pressure reducing chamber, a plurality of exit holes extending from the bottom of said pressure reducing chamber to the bottom end portion of said body, a washer having a centrally disposed orifice retained on said shelf, and a bushing of resilient material having a central vertical hole, adapted to receive the end of a distribution pipe, secured within the bushing hole in the top portion of said body and holding said washer on said shelf.

2. A metering tip for the ends of water distribution pipes of evaporative coolers, composed of a cylindrical body having a flat top and a conical body and a round bushing hole centrally disposed in its upper portion, a smaller hole therebelow providing an annular shelf at the bottom of said bushing hole and forming a pressure reducing chamber, and a deflection chamber centrally disposed in the bottom of said pressure reducing chamber, a plurality of exit holes extending from the bottom of said pressure reducing chamber to the bottom end portion of said body, a washer having a centrally disposed orifice retained on said shelf, and a bushing of resilient material having a central vertical hole, adapted to receive the end of a distribution pipe, secured within the bushing hole in the top portion of said body and holding said washer on said shelf; said exit holes each having a diameter larger than the diameter of the orifice hole in said washer.

References Cited in the file of this patent

UNITED STATES PATENTS

| 2,664,278 | Aghnides | Dec. 29, 1953 |
| 2,670,942 | Aghnides | Mar. 2, 1954 |
| 2,681,254 | Fuller | June 15, 1954 |

FOREIGN PATENTS

| 819,331 | France | July 5, 1937 |